(12) United States Patent
Tripathi et al.

(10) Patent No.: US 9,087,393 B2
(45) Date of Patent: Jul. 21, 2015

(54) NETWORK DISPLAY SUPPORT IN AN INTEGRATED CIRCUIT

(71) Applicant: Apple Inc., Cupertino, CA (US)

(72) Inventors: Brijesh Tripathi, Los Altos, CA (US); Peter F. Holland, Los Gatos, CA (US); Timothy J. Millet, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 13/788,209

(22) Filed: Mar. 7, 2013

(65) Prior Publication Data

US 2014/0253570 A1    Sep. 11, 2014

(51) Int. Cl.
*G09G 5/39* (2006.01)
*G06T 1/60* (2006.01)

(52) U.S. Cl.
CPC .................................. *G06T 1/60* (2013.01)

(58) Field of Classification Search
CPC ........... G06T 1/60; G09G 5/393; G09G 5/395
USPC ......................................................... 345/531
See application file for complete search history.

(56) References Cited

U.S. PATENT DOCUMENTS

| 7,098,868 | B2 | 8/2006 | Love et al. | |
|---|---|---|---|---|
| 8,259,121 | B2 | 9/2012 | Law et al. | |
| 8,275,031 | B2 | 9/2012 | Neuman | |
| 2004/0150751 | A1* | 8/2004 | Phillips et al. | 348/565 |
| 2009/0028047 | A1* | 1/2009 | Schmidt et al. | 370/235 |
| 2011/0249074 | A1* | 10/2011 | Cranfill et al. | 348/14.02 |
| 2012/0224643 | A1 | 9/2012 | Wang et al. | |
| 2014/0075117 | A1* | 3/2014 | Tripathi et al. | 711/118 |

* cited by examiner

*Primary Examiner* — Stephen R Koziol
*Assistant Examiner* — Shivang Patel
(74) *Attorney, Agent, or Firm* — Meyertons, Hood, Kivlin, Kowert & Goetzel, P.C.; Lawrence J. Merkel (57) ABSTRACT

In an embodiment, a system includes hardware optimized for communication to a network display. The hardware may include a display pipe unit that is configured to composite one or more static images and one or more frames from video sequences to form frames for display by a network display. The display pipe unit may include a writeback unit configured to write the composite frames back to memory, from which the frames can be optionally encoded using video encoder hardware and packetized for transmission over a network to a network display. In an embodiment, the display pipe unit may be configured to issue interrupts to the video encoder during generation of a frame, to overlap encoding and frame generation.

20 Claims, 5 Drawing Sheets

NETWORK DISPLAY SUPPORT IN AN INTEGRATED CIRCUIT

BACKGROUND

1. Field of the Invention

This invention is related to the field of digital systems and, more particularly, to connecting the systems to network displays.

2. Description of the Related Art

Digital systems of various types often include, or are connected to, a display for the user to interact with the device. The display can be incorporated into the device. Examples of incorporated displays include the touchscreen on various smart phones, tablet computers, or other personal digital assistants and laptops with the screen in the lid. The display can also be connected to the device via a cable. Examples of the connected display include various desktop computers and workstations having a separate display that resides on the desk in front of the user. Some desktops also have an incorporated display (e.g. various iMac® computers from Apple Inc.). The display provides a visual interface that the user can view to interact with the system and applications executing on the system. In some cases (e.g. touchscreens), the display also provides a user interface to input to the system. Other user input devices (e.g. keyboards, mice or other pointing devices, etc.) can also be used.

In the above cases, the digital system includes hardware to interface directly to the display, driving the control signals to control the display of each pixel (e.g. red, green, and blue control signals) in real time as the pixels are displayed on the screen. The hardware generates the timing for the display as well, such as the vertical and horizontal blanking Interfaces such as video graphics adapter (VGA), high definition media interface (HDMI) etc. can be used to connect to these displays.

More recently, network displays are becoming popular. In a network display, the connection between the digital system and the display is a network such as Ethernet, WiFi networks, etc. The digital system provides a frame of pixels to be displayed as the data payload in one or more packets transmitted over the network, and the network display receives the packets and controls its own internal timing to display the received frames. Accordingly, the network display is no longer truly a real time device. However, latency between the system and the network display is still an important factor, since the user is viewing the display and may be interacting with the system as well. The network display interface includes the network protocol stack and the operating system, between the application that generates the frames and the network display. The operating system and the network protocol stack are not typically real time, and so the delays can be unpredictable. Additionally, in some cases, the network display is used to display the same frames as the local display (incorporated or directly connected) in "mirror mode" (e.g. when making a presentation). Again, the latency to provide the frames to the network display affects the user's perception of whether or not the system is working properly.

SUMMARY

In an embodiment, a system includes hardware optimized for communication to a network display. The hardware may include a display pipe unit that is configured to composite one or more static images and one or more frames from video sequences to form frames for display by a network display. The display pipe unit may include a writeback unit configured to write the composite frames back to memory, from which the frames can be optionally encoded using video encoder hardware and packetized for transmission over a network to a network display. In an embodiment, the display pipe unit may be configured to issue interrupts to the video encoder during generation of a frame, to overlap encoding and frame generation.

In some embodiments, the system may reduce the latency for communicating frames to the network display. The system may also include a second display pipe unit that controls the internal/local display. The second display pipe unit may generate the frames for display on the local display, and the frames may be the same as the network display frames (except for differences in the displays themselves, e.g. color depth and resolution) in a mirror mode of operation. The frames generated by the first display pipe unit may be generated more quickly than the corresponding frames of the second display pipe unit, because the frames are not tied to the pixel clock that the local display uses. In this fashion, the delays in transmitting the packets to the network display may be at least partially offset by the more rapid frame generation, allowing a more true mirror mode functionality to occur.

BRIEF DESCRIPTION OF THE DRAWINGS

The following detailed description makes reference to the accompanying drawings, which are now briefly described.

FIG. 7 is a block diagram of one embodiment of the system coupled to a network display over a wireless network While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/ circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Figure 1:
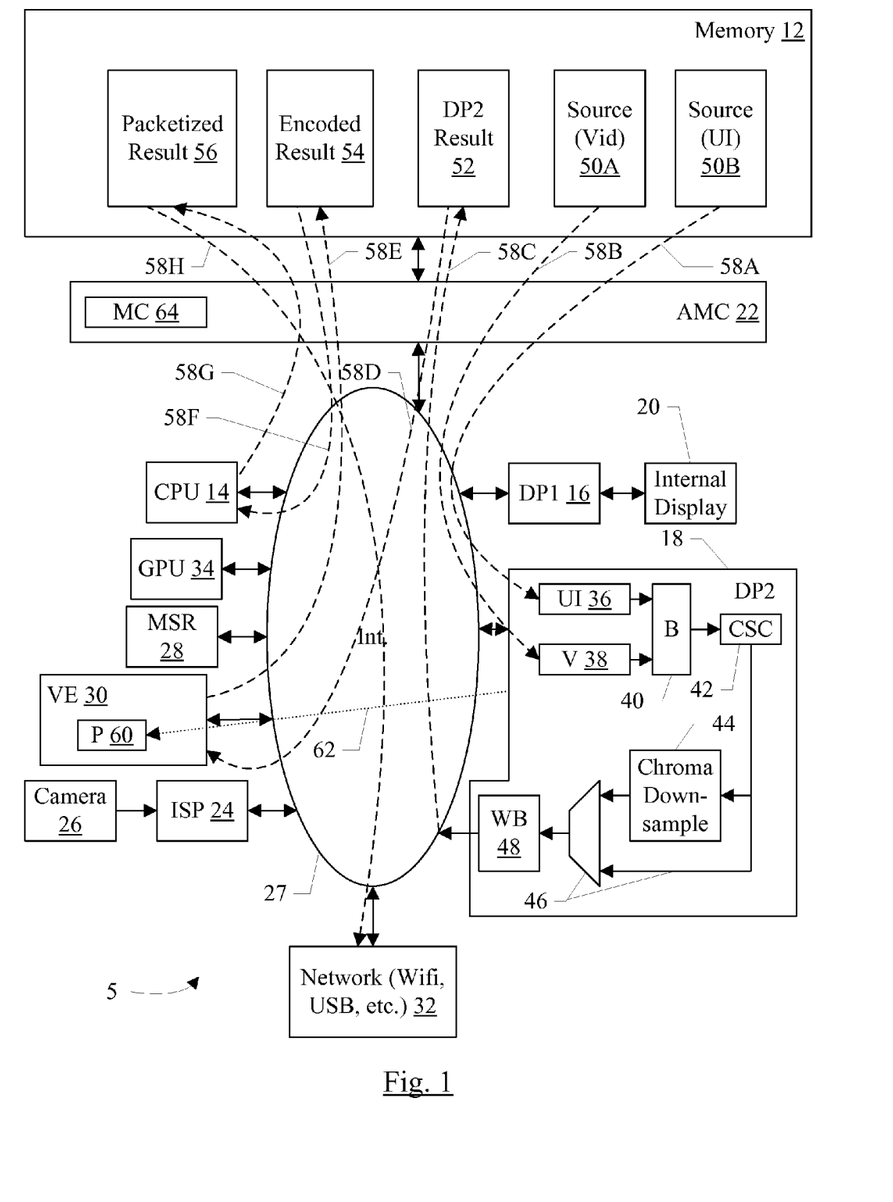
FIG. 1 is a block diagram of one embodiment of a system including components of an integrated circuit (IC) forming a system on a chip (SoC).

Turning now to FIG. 1, a block diagram of one embodiment of a system 5 is shown. In one embodiment, one or more of the components of the system 5 may be integrated onto a single semiconductor substrate as an integrated circuit "chip" often referred to as a system on a chip (SOC). In other embodiments, the components may be implemented on two or more discrete chips. In the illustrated embodiment, the components of the system 5 that are incorporated into the SOC include a central processing unit (CPU) complex 14, display pipe units 16 and 18, a memory controller 22, an image signal processor (ISP) 24, a communication fabric or interconnect 27, a graphics processing unit (GPU) 34, a memory scalar/rotator (MSR) 28, a video encoder (VE) 30, and a network interface 32. The components 14, 16, 18, 22, 24, 28, 30, 32, and 34 may all be coupled to the communication fabric 27. The memory controller 22 may be coupled to a memory 12 during use. Similarly, the ISP 24 may be coupled to one or more image sensors 26 (such as a camera) during use and the display pipe unit 16 may be coupled to a local display 20 during use.

The display pipe unit 16 (or more briefly "display pipe") may be configured to read one or more video sources 50A-50B stored in the memory 12, composite frames from the video sources, and display the resulting frames on the internal display 20. Accordingly, the frames displayed on the internal display 20 may not be directly retained in the system 5 as a result of the operation of the display pipe 16. The display pipe 18, on the other hand, may be configured to read one or more video sources 50A-50B, composite the frames to generate output frames, and may write the output frames to the memory system (e.g. the memory 12, illustrated in FIG. 1 as the DP2 result 52). Accordingly, output frames may be available for further processing in the system 5 (e.g. encoding by the video encoder 30 to produce the encoded result 54, packetization for network transmission stored as the packetized result 56, etc.). In one embodiment, the output frames written to the memory system may be transmitted to a network display over a network via the circuitry 32. For example, the network may include a wireless fidelity (WiFi) network, a cellular data network, a universal serial bus (USB) network, a wired network such as Ethernet, asynchronous transfer mode (ATM), digital subscriber line (DSL), modem over plain old telephone service (POTS), synchronous optical network (SONET), etc. The packetization may be performed using a standard protocol stack such as transport control protocol/Internet protocol (TCP/IP), for example. In mirror mode, the display pipes 16 and 18 may both process the same video sources 50A-50B in parallel. In other modes, the display pipes 16 and 18 may read different video sources (and only one display pipe 16 or 18 may be active, in some modes).

A local display such as internal display 20 may be a display that is directly connected to the system 5 and is directly controlled by the system 5. The system 5 may provide various control signals to the display, including timing signals such as one or more clocks and/or the vertical blanking interval and horizontal blanking interval controls. The clocks may include the pixel clock indicating that a pixel is being transmitted. The data signals may include color signals such as red, green, and blue, for example. The system may control the display in real-time, providing the data indicating the pixels to be displayed as the display is displaying the image indicated by the frame. The interface to the internal display may be, for example, VGA, HDMI, digital video interface (DVI), a liquid crystal display (LCD) interface, a plasma interface, a cathode ray tube (CRT) interface, any proprietary display interface, etc. An internal display may be a display that is integrated into the housing of the system 10. For example, the internal display may include a touchscreen display for a personal digital assistant, smart phone, tablet computer, or other mobile communication device. The touchscreen display may form a substantial portion or even all of one of the faces of such mobile communication devices. The internal display may also be integrated into the lid of the device such as in a laptop or net top computer, or into the housing of a desktop computer. Accordingly, in addition to the hardware circuitry to composite the various video sources 50A-50B, the display pipe 16 may include circuitry to generate the local display controls. The display pipes 16 and 18 may be described as having a front end (compositing hardware to produce output frames) and a back end. The back end of the display pipe 16 may generate the control interface to the internal display 20. The back end of the display pipe 18 may include circuitry to write the output frames back to the memory system 12 for further processing, packetization for the network display, etc.

A network may generally refer to any mechanism for general communication between devices according to a defined communication interface and protocol. The network may define packets which may be used to communicate among the devices. The packet may include, for example, a header that identifies the source and/or destination of the packet on the network (e.g. a source address and/or destination address on the network) and various other information about the packet, as well as a payload or data field containing the data. The payload may be a portion or all of the frame to be displayed, for example, when the packets are between the system 5 and the network display.

As mentioned previously, the network may be a standard network such as WiFi, Ethernet, and others as set forth above. The WiFi standards may include, for example, Institute of Electrical and Electronic Engineers (IEEE) 802.11 versions a, b, g, n, and any other versions. The cellular data network may include, e.g., 3G, 4G, long term evolution (LTE), etc. The network protocol stack may follow the Open Systems Interconnection (OSI) model of layers, some of which may be implemented in software executed by the processors in the CPU complex 14.

The display pipe 18 is shown in greater detail in FIG. 1 to include a user interface pipe 36, a video pipe 38, a blend unit 40, a color space converter 42, a chroma downsample unit 44, a bypass path 46, and a writeback unit 48. The user interface pipe 36, the video pipe 38 and the blend unit 40 may form the front end of the display pipe 18. The color space converter 42, the chroma downsample unit 44, and the bypass path 46 may be viewed as part of the front end as well. The back end may be the writeback unit 48.

The writeback unit 48 may be configured to generate one or more write operations on interconnect fabric 27 to write frames generated by the display pipe 18 to the memory system. The writeback unit 48 may be programmable with a base address of the DP2 result area 52, for example, and may write frame data beginning at the base address as the data is provided from the front end. The writeback unit 48 may include buffering, if desired, to store a portion or all of the frame to avoid stalling the front end if the write operations are delayed, in some embodiments.

In an embodiment, the display pipe 18 may include line buffers configured to store the output composited frame data for reading by the video encoder 30. That is, the video encoder 30 may read data from the display pipe 18 rather than the memory controller 22 in such embodiments. The composited frame data may still be written to the DP result 52 in the memory as well (e.g. for use as a reference frame in the encoding process).

The user interface pipe 36 may include hardware to process a static frame for display. Any set of processing may be performed. For example, the user interface pipe 36 may be configured to scale the static frame. Other processing may also be supported (e.g. color space conversion, rotation, etc.) in various embodiments. The user interface pipe 36 may be so named because the static images may, in some cases, be overlays displayed on a video sequence. The overlays may provide a visual interface to a user (e.g. play, reverse, fast forward, and pause buttons, a timeline illustrating the progress of the video sequence, etc.). More generally, the user interface pipe 36 may be any circuitry to process static frames. While one user interface pipe 36 is shown in FIG. 1, there may be more than one user interface pipe to concurrently process multiple static frames for display. The user interface pipe 36 may further be configured to generate read operations to read the static frame (e.g. video source 50B in FIG. 1).

The video pipe 38 may be configured to generate read operations to read a video sequence source (e.g. video source 50A in FIG. 1). A video sequence may be data describing a series of frames to be displayed at a given display rate (also referred to as a refresh rate). The video pipe 38 may be configured to process each frame for display. For example, in an embodiment, the video pipe 38 may support dither, scaling, and/or color space conversion. In an embodiment, the blend unit 40 may be configured to blend in the red, green, blue (RGB) color space, and video sequences may often be rendered in the luma-chroma (YCrCb, or YUV) color space. Accordingly, the video pipe 38 may support YCrCb to RGB color space conversion in such an embodiment. While one video pipe 38 is illustrated in FIG. 1, other embodiments may include more than one video pipe.

The blend unit 40 may be configured to blend the frames produced by the user interface pipe 36 and the video pipe 38. The display pipe 16 may be configured to blend the static frames and the video sequence frames to produce output frames for display. In one embodiment, the blend unit 40 may support alpha blending, where each pixel of each input frame has an alpha value describing the transparency/opaqueness of the pixel. The blend unit may multiply the pixel by the alpha value and add the results together to produce the output pixel. Other styles of blending may be supported in other embodiments.

In the illustrated embodiment, the display pipe 18 may support a color space conversion on the blended output using the color space conversion unit 42. For example, if the network display is configured to display frames represented in the YCrCb space and the blend unit 40 produces frames represented in the RGB space, the color space conversion unit 42 may convert from RGB to YCrCb. Other embodiments may perform the opposite conversion or other conversions, or may not include the color space conversion unit 42. Additionally, the color space conversion may be supported for other downstream processing (e.g. for the video encoder 30, in this embodiment) rather than for the network display itself.

Some video encoders operate on downsampled chroma color components. That is, the number of samples used to describe chroma components may be less than the number of samples used to describe the luma component. For example, a 4:2:2 scheme uses one sample of luma for every pixel, but one sample of Cb and Cr for every two pixels on each line. A 4:2:0 scheme uses one sample of luma for every pixel, but one sample of Cb and Cr for every two pixels on every alternate line with no samples of Cb and Cr in between. To produce pixels useable by such a video encoder, the chroma downsample unit 44 may be provided to downsample the chroma components. Downsampling may generally refer to reducing the number of samples used to express a color component while retaining as much of the color component as possible. For cases in which the video encoder supports full chroma components, the bypass path 46 may be used to bypass the chroma downsample unit 44. Other embodiments may not include a chroma downsample unit, as desired.

The various processing performed by the display pipes 16 and 18 may generally be referred to as compositing. Compositing may include in processing by which image data from various images (e.g. frames from each video source) are combined to produce an output image. Compositing may include blending, scaling, rotating, color space conversion, etc.

Generally, a frame may be a data structure storing data describing an image to be displayed. The data may describe each pixel to be displayed, in terms of color in a color space. Any color space may be used. A color space may be a set of color components that describe the color of the pixel. For example, the RGB color space may describe the pixels in terms of an intensity (or brightness) of red, green, and blue that form the color. Thus, the color components are red, green, and blue. Another color space is the luma-chroma color space which describes the pixels in terms of luminance and chrominance values. The luminance (or luma) component may represent the brightness of a pixel (e.g. the "black and whiteness" or achromatic part of the image/pixel). The chrominance (or chroma) components may represent the color information. The luma component is often denoted Y and the chrominance components as Cr and Cb (or U and V), so the luma-chroma color space is often referred to as YCrCb (or YUV). When converting from RGB, the luma component may be the weighted sum of the gamma-compressed RGB components, and the Cr and Cb components may be the red component (Cr) or the blue component (Cb) minus the luma component.

The dashed arrows in FIG. 1 may illustrate the movement of data for processing video sources and providing frames to a network display. The display pipe 18 may be configured to read the video sources 50A-50B (and more particularly the user interface pipe 36 may be configured to read the source 50B and the video pipe 38 may be configured to read the source 50A—arrows 58A and 58B, respectively). The resulting output frames may be written to the DP2 result area 52 in the memory 12 by the display pipe 18 (and more particularly the writeback unit 48 may be configured to perform the writes—arrow 58C). The video encoder 30 may be configured to read the DP2 result area 52 and encode the frame, providing an encoded result 54. Encoding the frame may include compressing the frame, for example, using any desired video compression algorithm. For example, motion picture estimation group (MPEG) encoding may be used, whereby data for a frame can be generated by reference to other frames. Any encoding scheme or schemes may be used in various embodiments. The video encoder may write the encoded result to the memory 12 (encoded result 54, arrow 58E).

The encoded result 54 may be processed by the network protocol stack to generate packets for transmission on the network to the network display. In one embodiment, the network protocol stack is implemented in software executed by the processors in the CPU complex 14. Accordingly, the CPU complex 14 may read the encoded result 54 (arrow 58F), packetize the result, and write the packets to another memory area 56 (arrow 58G). The packetized result 58 may be read by the network interface hardware 32 for transmission on the network (arrow 58H).

In an embodiment, the network interface hardware 32 may be specialized network hardware (e.g. a media access control (MAC) unit and/or data link layer hardware). In another embodiment, the network interface hardware 32 may be a peripheral interface unit configured to communicate on a peripheral interface to which the network interface controller (NIC) may be coupled. Such peripheral interfaces may include, e.g., USB, peripheral component interconnect (PCI), PCI express (PCIe), etc.

It is noted that, while FIG. 1 illustrates various intermediate results in generating the packets for the network display, some embodiments may store further intermediate results in the memory 12 as well. For example, processing through the various layers of the network protocol stack may include storing the packets in various intermediate forms in the memory 12. Furthermore, there may be multiple copies of various results 52, 54, and 56 to allow for overlapped processing (e.g. the results 52, 54, or 56 may be ping pong buffers of two or more frames of data).

The video encoder 30 may include various video encoder acceleration hardware, and may also include a local processor 60 which may execute software to control the overall encoding process. In one embodiment, the display pipe 18 may be configured to generate an interrupt directly to the video encoder 30 (and more particularly to the processor 60) to indicate the availability of frame data in the DP2 result 52 for encoding. That is, the interrupt may not be passed though interrupt controller hardware which may process and prioritize various interrupts in the system 5, such as interrupts to be presented to the processors in the CPU complex 14. The interrupt is illustrated as dotted line 62. The interrupt may be transmitted via a dedicated wire from the display pipe 18 to the video encoder 30, or may be an interrupt message transmitted over the interconnect fabric 27 addressed to the video encoder 30. In some embodiments, the display pipe 18 may be configured to interrupt the video encoder 30/processor 60 multiple times during generation and writing back of a frame to the DP2 result 52, to overlap encoding and generation of the frame. Other embodiments may use a single interrupt at the end of the frame generation.

The memory controller 22 may generally include the circuitry for receiving memory requests from the other components of the system 5 and for accessing the memory 12 to complete the memory requests. In the illustrated embodiment, the memory controller 22 may include a memory cache 64 to store recently accessed memory data. In SOC implementations, for example, the memory cache 64 may reduce power consumption in the SOC by avoiding reaccess of data from the memory 12 if it is expected to be read again soon. In mirror mode, the fetches by the display pipe 18 may be placed in the memory cache 64 (or portions of the fetches may be placed in the memory cache 64) so that the subsequent reads by the display pipe 16 may detect hits in the memory cache 64. The interconnect fabric 27 may support the transmission of cache hints with the memory requests to identify candidates for storing in the memory cache 64. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.).

The memory cache 64 may also be used to store composited frame data generated by the display pipe 18. Since the composited frame data may be read by the video encoder 30 within a relatively short period of time after generation, the video encoder reads are likely to hit in the memory cache 64. Thus, the storing of the composited data in the memory cache 64 may reduce power consumption for these reads and may reduce latency as well.

The ISP 24 may be configured to receive image sensor data from the image sensors 26 (e.g. one or more cameras) and may be configured to process the data to produce image frames that may be suitable, e.g., for display on the local display 20 and/or a network display. Cameras may include, e.g., charge coupled devices (CCDs), complementary metal-oxide-semiconductor (CMOS) sensors, etc.

The CPU complex 14 may include one or more CPU processors that serve as the CPU of the SOC/system 5. The CPU of the system includes the processor(s) that execute the main control software of the system, such as an operating system. Generally, software executed by the CPU during use may control the other components of the system 5 to realize the desired functionality of the system 5. The CPU processors may also execute other software, such as application programs. The application programs may provide user functionality, and may rely on the operating system for lower level device control. Accordingly, the CPU processors may also be referred to as application processors. The CPU complex 14 may further include other hardware such as an L2 cache and/or and interface to the other components of the system 5 (e.g. an interface to the communication fabric 27).

The GPU 24 may include one or more GPU processors, and may further include local caches for the GPUs and/or an interface circuit for interfacing to the other components of the system 5 (e.g. an interface to the communication fabric 27). Generally, GPU processors may be processors that are optimized for performing operations in a graphics pipeline to render objects into a frame. For example, the operations may include transformation and lighting, triangle assembly, rasterization, shading, texturizing, etc.

The MSR 28 may be configured to perform scaling and/or rotation on a frame stored in memory, and to write the resulting frame back to memory. The MSR 28 may be used to offload operations that might otherwise be performed in the GPU 24, and may be more power-efficient than the GPU 24 for such operations.

In general, any of the MSR 28, the GPU 34, the ISP 24, and/or software executing in the CPU cluster may be sources for the video source data 50A-50B. Additionally, video source data 50A-50B may be downloaded to the memory 12 from the network to which the circuitry 32 is coupled, or from other peripherals in the system 5 (not shown in FIG. 1).

Although not explicitly illustrated in FIG. 1, the system 5 may include other peripherals. The peripherals may be any set of additional hardware functionality included in the system 5 (and optionally incorporated in the SOC). For example, the peripherals 18A-18B may include other video peripherals such as video decoders, etc. The peripherals may include audio peripherals such as microphones, speakers, interfaces to microphones and speakers, audio processors, digital signal processors, mixers, etc. The peripherals may include interface controllers for various interfaces external to the SOC including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 27 may be any communication interconnect and protocol for communicating among the components of the SOC and/or system 5. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC and/or system 5 may vary from embodiment to embodiment. There may be more or fewer of each component than the number shown in FIG. 1.

Figure 2:
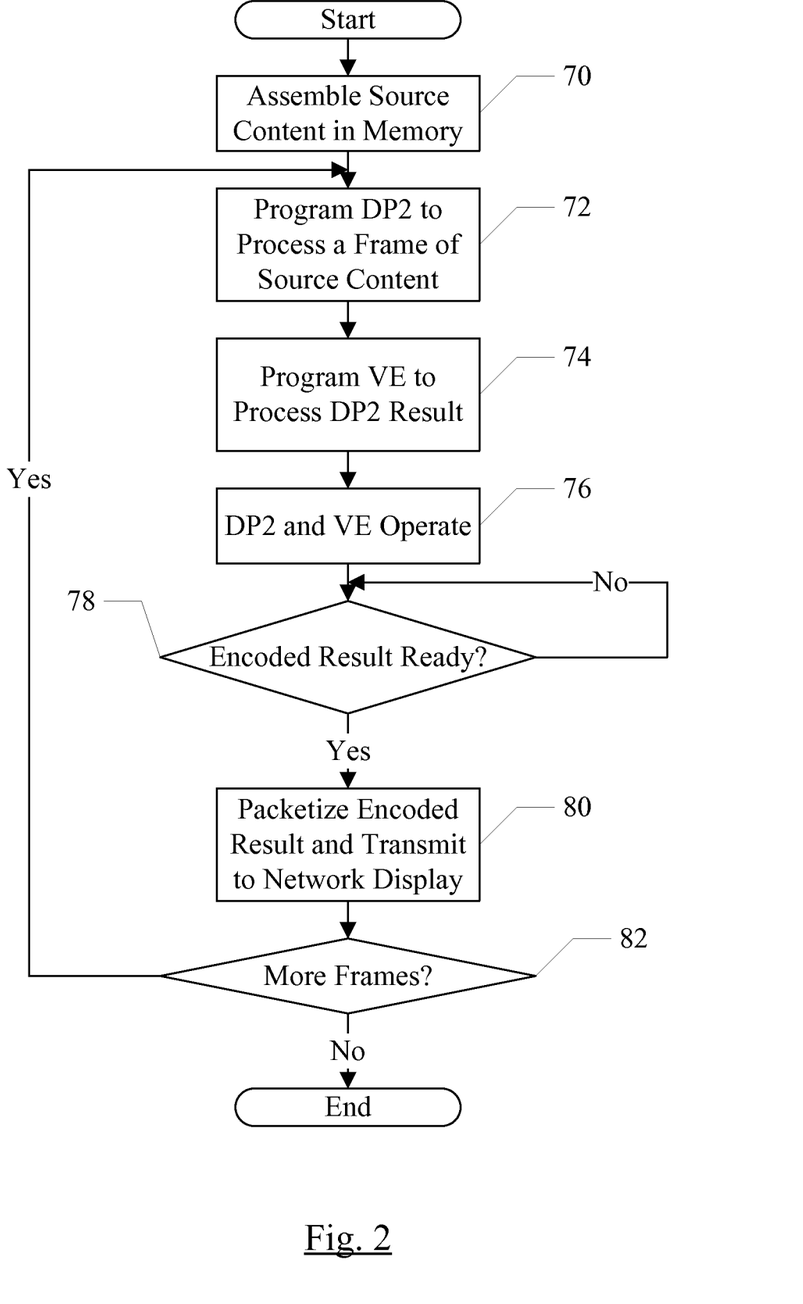
FIG. 2 is a flowchart illustrating operation of one embodiment of the components and software executed on the system to display on a network display.

Turning now to FIG. 2, a flowchart is shown illustrating operation of one embodiment of the system 5 to operate the network display. While the blocks are shown in a particular order for ease of understanding, other orders may be used. Blocks may be performed in parallel by combinatorial logic in the system and/or, for software portions, execution by multiple processors. Blocks, combinations of blocks, and or the flowchart as a whole may be pipelined over multiple clock cycles and/or multiple instructions for execution. Blocks that are implemented in software may represent instructions which, when executed on a processor in the system such as the processors in the CPU complex 14, may implement the operation describe for the block. Blocks that are implemented in hardware may represent hardware that is configured to perform the operation.

The system 5 may assemble the source content (e.g. video sources 50A-50B) in the memory 12 (block 70). Assembly of the source content may be at least partially implemented in software, in some embodiments. More particularly, the source content may be generated by software executing on the GPU 34, rendering image data. The source content may be generated by the MSR 28 and/or the ISP 24, either of which may be programmed by software executing on the CPU complex 14. The source content may also be downloaded from the network via the circuitry 32.

Software executing on the CPU complex 14 may program the display pipe 18 to processor a frame of source content from the video sources 50A-50B (block 72). The programming may be accomplished directly, or through a direct memory access (DMA) of data for the various control registers in the display pipe 18 (not shown in FIG. 1). For example, the programming may point the display pipe 16 to the sources 50A-50B in the memory 12, describe the size and pixel format, etc.

Software executing on the CPU complex 14 may program the video encoder 30 to process the DP2 result 52. Again, the programming may be accomplished directly or through a DMA in various embodiments. The programming may point the video encoder 30 to the DP2 result 52 in memory, describe the size and pixel format, etc.

The display pipe 18 and the video encoder 30 may perform their operations (block 76) to generate the DP2 result 52 and the encoded result 54, respectively. As mentioned previously, the display pipe 18 may be configured to interrupt the video encoder 30 in response to completing DP2 result 52, in an embodiment. In an embodiment, the display pipe 18 may be configured to interrupt the video encoder 30 multiple times during generation of the DP2 result 52 to overlap generation of the DP2 result 52 and the encoded result 54.

When the encoded result 54 is completed by the video encoder 30 (decision block 78, "yes" leg), the system 5 may packetize the encoded result 54 to generate the packetized result 56 and may transmit the packet(s) to the network display (block 80). In an embodiment, packetize the result may include processing the result in the standard network protocol stack. The network protocol stack may be at least partially implemented in software executed in the CPU complex 14, in an embodiment, although the link layer and optionally the media access control (MAC) layer may be hardware in the circuitry 32 or a network adapter to which the circuitry 32 is coupled. In an embodiment, packetization may be overlapped with video encoding. For example, the video encoder 30 may be programmed to interrupt the CPU complex 14 or to write a memory location that is monitored by software executing on the CPU complex 14 each time a packet-worth of data is generated by the video encoder 30.

If there are more frames to be processed (decision block 82, "yes" leg), the system 5 may return to block 72 to process the next frame. Alternatively, if the display pipe 16 and/or the video encoder 30 do not need to be reprogrammed, the respective blocks 72 and 74 may be skipped. Additionally, in some embodiments, the programming performed by the blocks 72 and/or 74 may differ on the initial frame of a video sequence and subsequent frames (e.g. there may be less programming/reprogramming needed after the initial frame). Still further, the packetization of the encoded result 54 and the generation of the next frame by the display pipe 16 may be overlapped in some embodiments, and the operation of the video encoder 30 may also be overlapped with the packetization in some embodiments.

Figure 3:
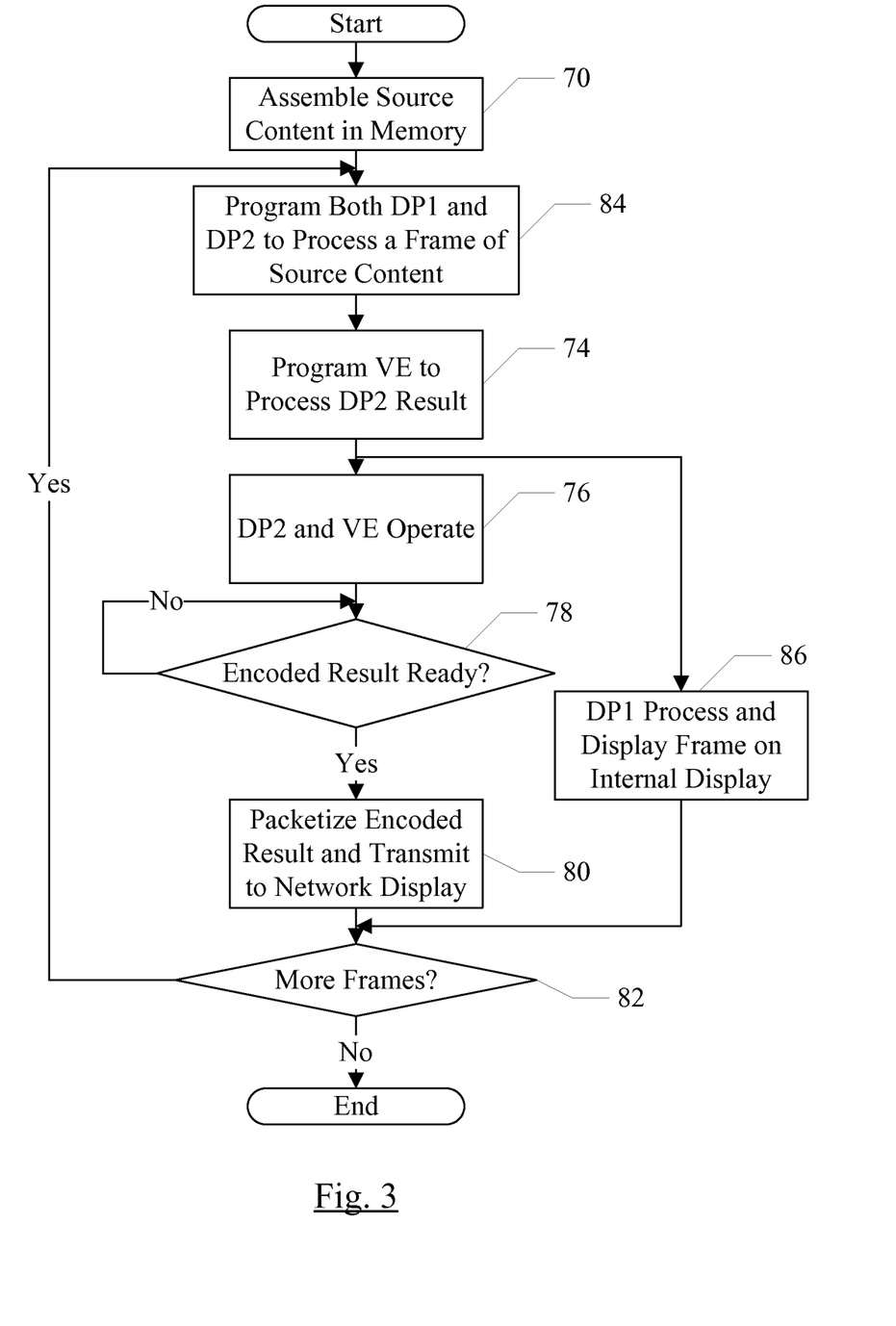
FIG. 3 is a flowchart illustrating operation of one embodiment of the components and software executed on the system to display on a network display in mirror mode with an internal display.

Turning now to FIG. 3, a flowchart is shown illustrating operation of one embodiment of the system 5 to operate the network display and the internal display 20 in mirror mode. While the blocks are shown in a particular order for ease of understanding, other orders may be used. Blocks may be performed in parallel by combinatorial logic in the system and/or, for software portions, execution by multiple processors. Blocks, combinations of blocks, and or the flowchart as a whole may be pipelined over multiple clock cycles and/or multiple instructions for execution. Blocks that are implemented in software may represent instructions which, when executed on a processor in the system such as the processors in the CPU complex 14, may implement the operation describe for the block. Blocks that are implemented in hardware may represent hardware that is configured to perform the operation.

Similar to the flowchart of FIG. 2, the source content may be assembled in the memory 12 (block 70). In this case, both the display pipes 16 and 18 may be programmed to process a frame of the source content (block 84). The video encoder may be programmed to process the DP2 result 52 (block 74), and the display pipe 18 and video encoder 30 may operate to produce the DP2 result 52 and the encoded result 54 (block 76). In parallel with the display pipe 18 and video encoder 30, the display pipe 16 may process the frame and display the frame on the internal display (block 86). Once the encoded result 54 is ready for packetization (or at least one packet worth is ready—decision block 78, "yes" leg), the system 5 may packetize the encoded result 54 to produce the packetized result 56 and may transmit the packet to the network display (block 80).

The system 5 may determine if there are more frames to be generated and if so (decision block 82, "yes" leg), may return to block 84 (and/or may skip blocks 84 and/or 74, or perform fewer programming operations, as discussed above with regard to FIG. 2) to process the next frame.

Figure 4:
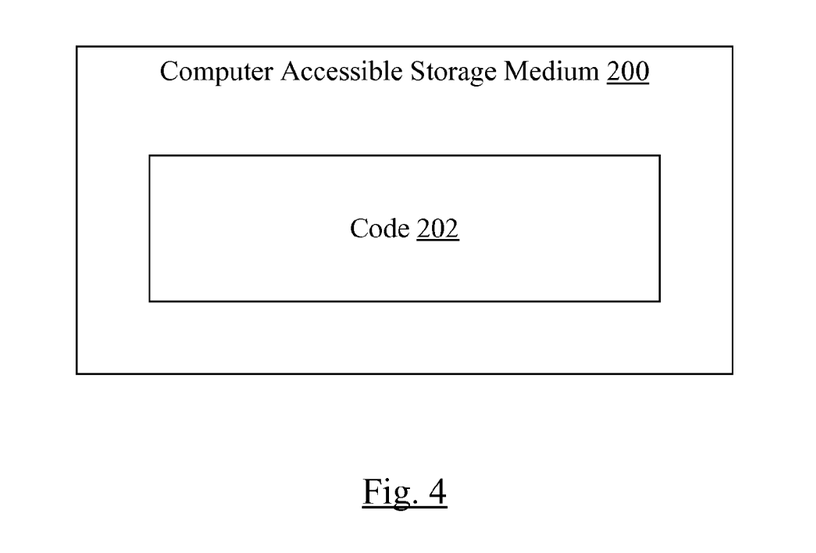
FIG. 4 is a block diagram of one embodiment of a computer accessible storage medium.

Turning now to FIG. 4, a block diagram of one embodiment of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 4 may store code 202. The code 202 may include the code described above with regard to FIG. 2 and/or the code described with regard to FIG. 3. The code 202 may further include any other code, as desired. The code 202 may include instructions which, when executed in the system 5, implement the operation described for various code above, particularly with regard to FIGS. 2 and 3. A carrier medium may include computer accessible storage media as well as transmission media such as wired or wireless transmission.

In an embodiment, the computer accessible storage medium 200 may include the memory 12 shown in FIG. 1.

Figure 5:
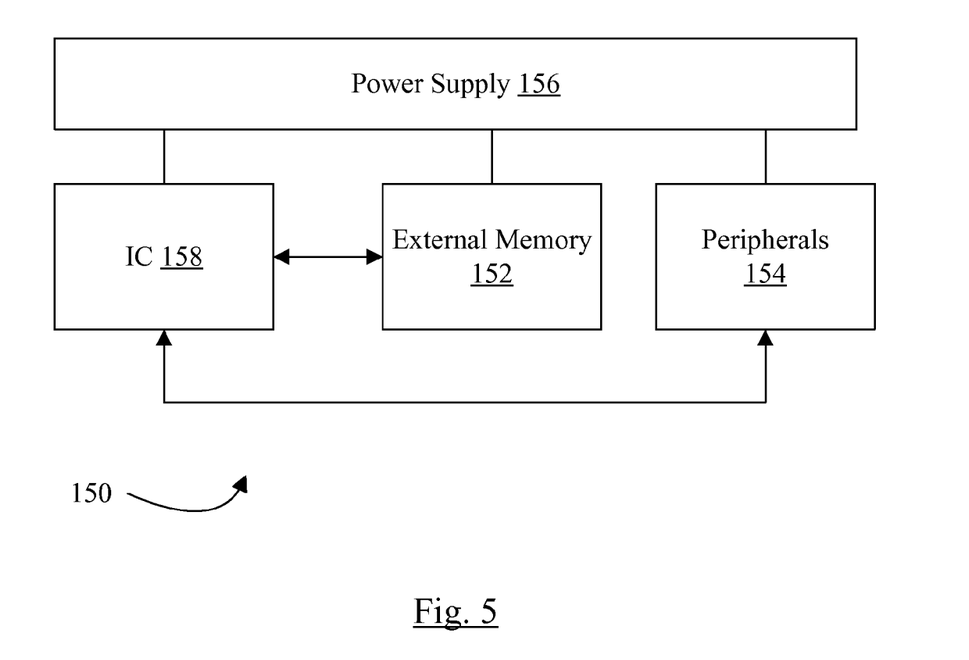
FIG. 5 is a block diagram of one embodiment of the IC shown in FIG. 1 in a system.

Turning next to FIG. 5, a block diagram of one embodiment of a system 150 is shown. In the illustrated embodiment, the system 150 includes at least one instance of an integrated circuit 158 coupled to one or more peripherals 154 and an external memory 152. A power supply 156 is provided which supplies the supply voltages to the integrated circuit 158 as well as one or more supply voltages to the memory 152 and/or the peripherals 154. In some embodiments, more than one instance of the integrated circuit 158 may be included (and more than one memory 152 may be included as well). The IC 158 may be the SOC described above with regard to FIG. 1, and components not included in the SOC may be the external memory 152 and/or the peripherals 154.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.). In an embodiment, the internal display 20 may be one of the peripherals 154. In an embodiment, the camera(s) 126 or other image sensors may be peripherals 154.

The external memory 152 may include any type of memory. For example, the external memory 152 may be SRAM, dynamic RAM (DRAM) such as synchronous DRAM (SDRAM), double data rate (DDR, DDR2, DDR3, etc.) SDRAM, RAMBUS DRAM, etc. The external memory 152 may include one or more memory modules to which the memory devices are mounted, such as single inline memory modules (SIMMs), dual inline memory modules (DIMM5), etc. Alternatively, the external memory 152 may include one or more memory devices that are mounted on the integrated circuit 158 in a chip-on-chip or package-on-package implementation. The external memory 152 may include the memory 12, in an embodiment.

Figure 6:
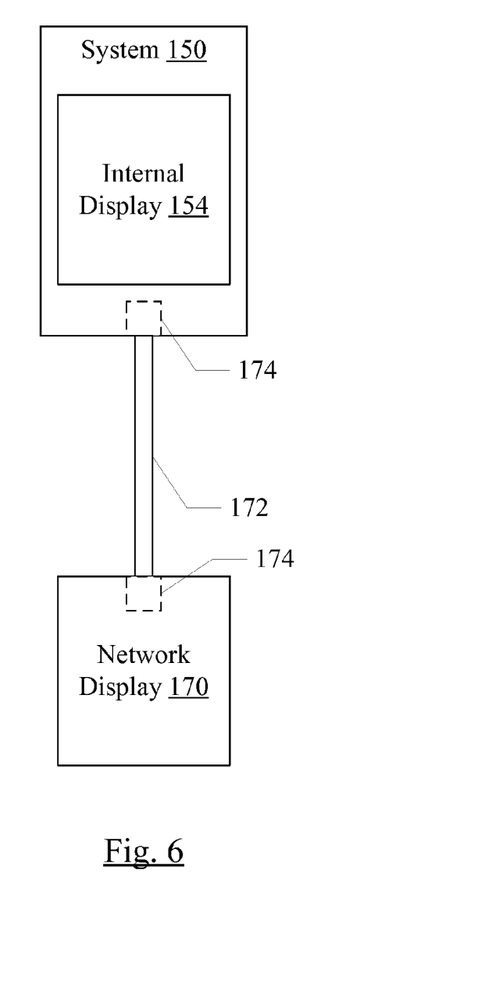
FIG. 6 is a block diagram of one embodiment of the system coupled to a network display over a wired network.

Turning now to FIG. 6, a block diagram of one embodiment of the system 150 is shown (including the internal display peripheral 154, which may be the internal display 20 as discussed above). The system 150 is coupled to a network display 170 over a wired network 172. The wired network 172 may be Ethernet, for example, or any other wired network including the various examples given above. In such embodiments, the system 150 may include a connector 174 suitable to connect to the network cable, and the network display may similarly include such a connector 174.

Figure 7:
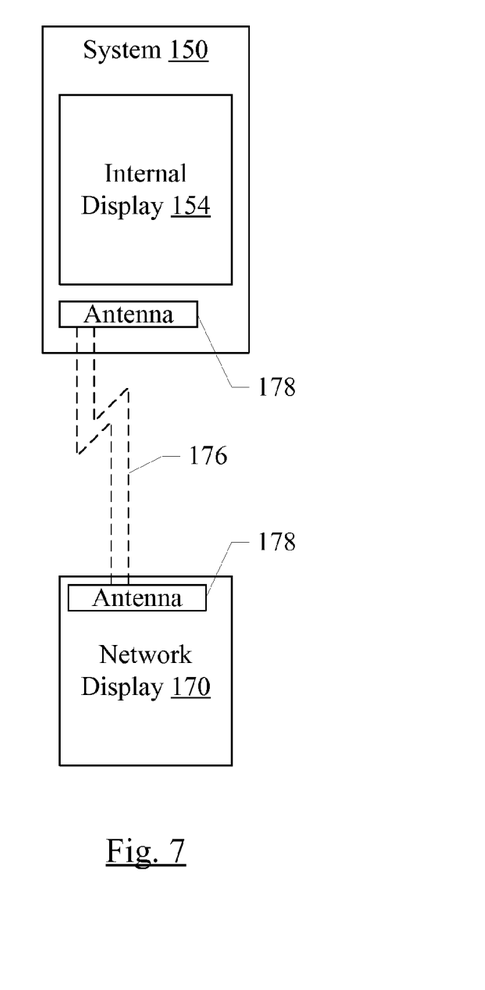

Alternatively, FIG. 7 is a block diagram of an embodiment of the system 150 coupled to a wireless network 176. The wireless network may be, e.g., WiFi and/or a cellular data network such as 3G, 4G, LTE, etc. In the embodiment of FIG. 7, each of the system 150 and the network display 170 may include an antenna 178 configured to broadcast/receive on the wireless network 176.

Numerous variations and modifications will become apparent to those skilled in the art once the above disclosure is fully appreciated. It is intended that the following claims be interpreted to embrace all such variations and modifications.

What is claimed is:

1. A system comprising:
    a memory system; and
    an integrated circuit coupled to the memory system, the integrated circuit comprising:
        a memory controller circuit coupled to the memory system;
        an interconnect coupled to the memory controller circuit;
        a first display pipe circuit coupled to the interconnect and configured to read frames from a plurality of sources from the memory system through the memory controller circuit and composite the frames from at least two of the plurality of sources, including blending the frames from the at least two of the plurality of sources for at least one frame, to generate an output frame, and wherein the first display pipe circuit includes a writeback circuit configured to write the output frame to the memory system;

a video encoder circuit coupled to the interconnect, wherein the video encoder circuit is configured to read the output frame from the memory system through the memory controller circuit and encode the output frame, and wherein the first display pipe circuit is configured to transmit an interrupt to the video encoder circuit over the interconnect to cause the video encoder circuit to begin encoding the output frame; and circuitry coupled to the interconnect and configured to transmit the encoded output frame as one or more packets over a network to a network display that is coupled to the network.

2. The system as recited in claim 1 further comprising a local display controlled by the system and a second display pipe circuit configured to read the frames from the plurality of sources from the memory system in parallel with the first display pipe circuit, composite the frames to generate the output frame, and display the output frame on the local display.

3. The system as recited in claim 1 further comprising a processor coupled to the interconnect, and wherein the processor is configured to generate the one or more packets responsive to executing a plurality of instructions.

4. The system as recited in claim 1 wherein the first display pipe circuit is configured to transmit a plurality of interrupts per output frame to overlap processing of the output frame by the video encoder circuit with generation of the output frame by the first display pipe circuit.

5. The system as recited in claim 1 wherein the plurality of sources comprise at least one static frame, and wherein the first display pipe circuit includes a first circuit configured to process the static frame and a blend circuit configured to blend the processed frame with other video data.

6. The system as recited in claim 5 wherein the plurality of sources further comprise a video sequence, and wherein the first display pipe includes a video pipeline configured to process the video sequence and generate corresponding frames to be blended with the processed frame.

7. The system as recited in claim 6 wherein the first display pipe circuit comprises a color space converter circuit coupled to the blend circuit and configured to convert the frame generated by the blend circuit to luma-chroma color space.

8. The system as recited in claim 7 wherein the first display pipe circuit further comprises a chroma downsample circuit coupled to the color space converter circuit and configured to downsample chroma components of the output frame.

9. The system as recited in claim 8 wherein the first display pipe circuit further comprises a bypass path to bypass the chroma downsample circuit, and wherein an output of the chroma downsample circuit and the bypass path is coupled to the writeback circuit.

10. The system as recited in claim 1 wherein the compositing further includes scaling one or more of the frames from the at least two sources.

11. The system as recited in claim 1 wherein the compositing further includes color space conversion to generate the output frame.

12. A method comprising:

reading frames from a plurality of sources from a memory system into a first display pipe circuit;

processing the frames in the first display pipe circuit to generate an output frame, wherein each output frame is a composite of respective frames from the plurality of sources, wherein the composite includes a blend of the respective frames for at least output frame;

writing the output frame from the first display pipe circuit to the memory system;

transmitting an interrupt from the first display pipe circuit to a video encoder circuit;

encoding the output frame in the video encoder circuit responsive to the interrupt to generate a first frame; and transmitting the first frame as one or more packets over a network to a network display.

13. The method as recited in claim 12 further comprising:

reading frames from the plurality of sources into a second display pipe circuit;

processing the frames in the second display pipe circuit to generate a second output frame; and displaying the second output frame by the second display pipe circuit on a local display controlled by the second display pipe circuit.

14. The method as recited in claim 12 further comprising:

reading frames from a second plurality of sources from the memory system into a second display pipe circuit;

processing the frames from the second plurality of sources in the second display pipe circuit to generate a second output frame;

displaying the second output frame by the second display pipe on a local display controlled by the second display pipe circuit.

15. The method as recited in claim 12 further comprising transmitting a plurality of interrupts from the first display pipe circuit to the video encoder circuit per output frame to overlap the encoding of the output frame and the processing of the output frame by the first display pipe circuit.

16. An integrated circuit comprising:

a memory controller circuit coupled to a memory system during use;

an interconnect coupled to the memory controller circuit;

a first display pipe circuit coupled to the interconnect and configured to read frames from a plurality of sources from the memory system through the memory controller circuit and composite the frames from at least two of the plurality of sources, including blending the frames from the at least two of the plurality of sources for at least one frame, to generate an output frame, and wherein the first display pipe circuit includes a writeback circuit configured to write the output frame to the memory system;

a video encoder circuit coupled to the interconnect, wherein the video encoder circuit is configured to encode the output frame, and wherein the first display pipe circuit is configured to transmit an interrupt to the video encoder circuit over the interconnect to cause the video encoder circuit to begin encoding the output frame; and circuitry coupled to the interconnect and configured to transmit the encoded output frame as one or more packets over a network to a network display that is coupled to the network.

17. The integrated circuit as recited in claim 16 further comprising a local display controlled by the system and a second display pipe circuit configured to read the frames from the plurality of sources from the memory system in parallel with the first display pipe circuit, composite the frames to generate the output frame, and display the output frame on the local display.

18. The integrated circuit as recited in claim 17 wherein the second display pipe circuit is configured to read the same frames from the same plurality of sources to generate the output frame to display on the local display.

19. The integrated circuit as recited in claim 17 wherein the second display pipe circuit is configured to read frames from at least one source of the same plurality of sources that is different from the sources read by the first display pipe circuit.

20. The integrated circuit as recited in claim 16 wherein the first display pipe circuit is configured to transmit a plurality of interrupts per output frame to overlap processing by the video encoder circuit with the frame generation.

* * * * *